Aug. 17, 1926.

M. G. WESTON 1,596,265

FASTENER INSERTING MACHINE

Filed Oct. 30, 1925     4 Sheets-Sheet 2

INVENTOR.
Maurice G. Weston
By his Attorney

Aug. 17, 1926.

M. G. WESTON 1,596,265

FASTENER INSERTING MACHINE

Filed Oct. 30, 1925

INVENTOR

Maurice G. Weston
By his Attorney
Nelson W. Howard

Aug. 17, 1926.
M. G. WESTON
FASTENER INSERTING MACHINE
Filed Oct. 30, 1925
1,596,265
4 Sheets-Sheet 4
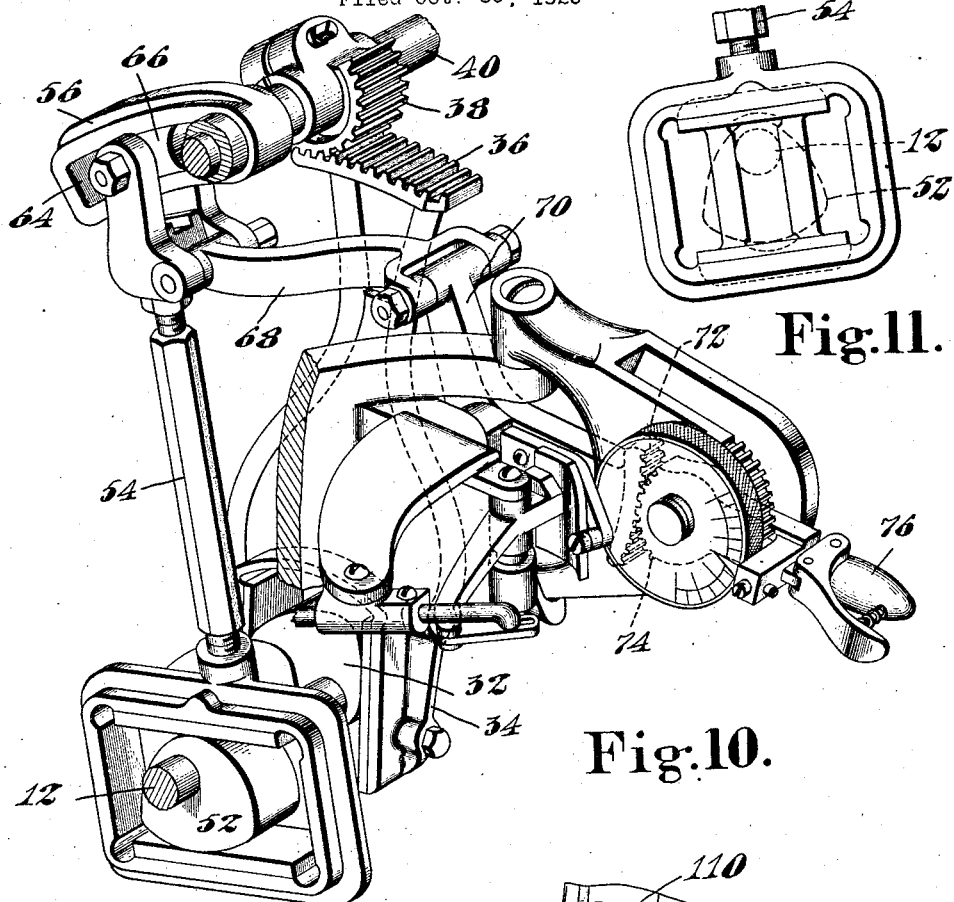
Fig. 11.
Fig. 10.
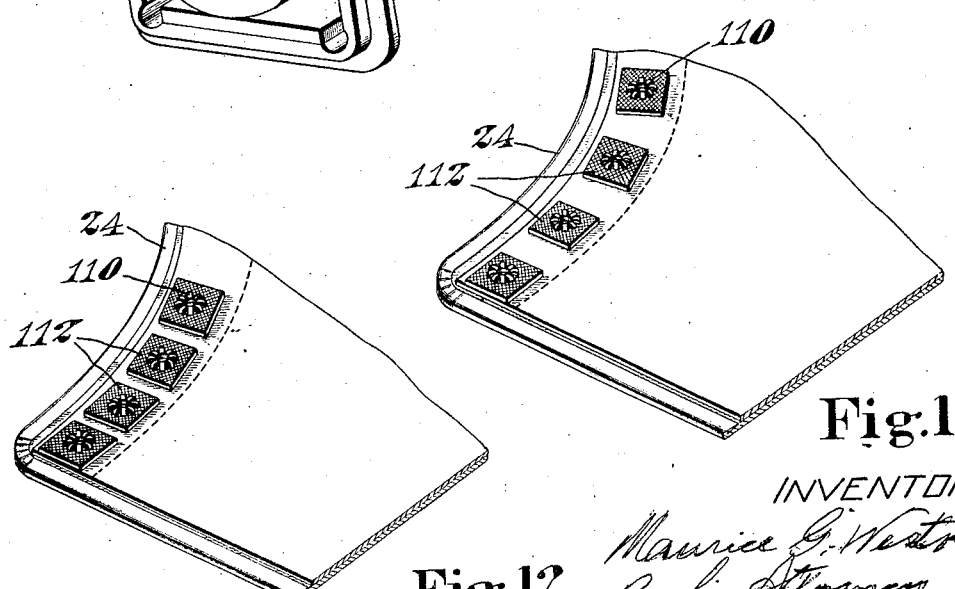
Fig. 13.
Fig. 12.
INVENTOR.
Maurice G. Weston
By his Attorney Patented Aug. 17, 1926.

1,596,265

UNITED STATES PATENT OFFICE.

MAURICE G. WESTON, OF CHICAGO, ILLINOIS, ASSIGNOR TO TUBULAR RIVET AND STUD COMPANY, OF BOSTON, MASSACHUSETTS, A CORPORATION OF MASSACHUSETTS.

FASTENER-INSERTING MACHINE.

Application filed October 30, 1925. Serial No. 65,870.

This invention relates to fastener-inserting machines and more especially to those in which pieces of reinforcing material are automatically severed from a strip and applied to the work to strengthen the anchorage of the fasteners. A typical example of work in which reinforcing pieces are severed and applied as above stated is performed by some machines for inserting lacing-hooks in shoe uppers. For purposes of illustration the invention is herein disclosed as embodied in a machine for inserting lacing-hooks in shoe-uppers, the general organization of which is similar to that illustrated in United States Letters Patent No. 811,839, granted February 6, 1906, on application of P. R. Glass, but it is to be understood that the invention is not limited to machines of the type herein disclosed.

It has been proposed to provide certain hook-inserting machines with mechanism for feeding a strip of reinforcing material to strip-severing means with steps shorter than those imparted to the work to be reinforced, the purpose being to save reinforcing material in cases where the distance between successive hooks is greater than the length of reinforcing material necessary to insure adequate anchorage for the hooks, but in the machines proposed for this purpose the organization is encumbered and complicated by an additional train of mechanism for feeding the strip of reinforcing material.

Accordingly, an object of this invention is to provide an improved organization in which a strip may be fed step by step without encumbering the machine with an additional train of mechanism and in which the feeding steps imparted to the strip may be shorter than those imparted to the work to avoid wasting the reinforcing material when the length of the work-feeding steps is greater than the length of reinforcing material necessary to insure adequate anchorage for the fasteners. Consequently, a feature of the invention consists in an improved organization comprising work-feeding mechanism and means arranged to impart to a reinforcing strip feeding steps shorter than those imparted to the work and arranged to receive its operative motions from the train of mechanism that feeds the work.

Another object of the invention is to provide improved means by which the length of the steps imparted to the strip may be readily regulated, to the end that in every case the individual sections of reinforcing material may have the necessary or desired standard length irrespective of the length of the feeding steps imparted to the work. This object is accomplished by a novel feature comprising an adjustable connection through which operating motion is transmitted from the work-feeding means to the strip-feeding means, and by which the length of feeding motion imparted to the strip may be regulated and maintained constant irrespective of changes in the length of the feeding steps imparted to the work.

Referring to the drawings:

Fig. 10 is a perspective view, partly in section, of a part of the train of regulatable work-feeding mechanism; this figure also includes a part of the train of mechanism for imparting punching motion to the tool that punches and feeds the work;

Fig. 11 is a front elevation of a portion of the cam-operated member shown at the left of Fig. 10; and Figs. 12 and 13 illustrate two typical examples of work, and include portions of two shoe uppers to which lacing-hooks and severed sections of a strip of reinforcing material have been applied. In Fig. 13 the lacing-hooks are spaced farther apart than in Fig. 12, but the sections of reinforcing material are of the same dimensions.

As hereinbefore stated, the general organization of the fastener-inserting machine, with the exception of the strip-feeding means and the strip-severing means, is similar to the disclosure in said Letters Patent No. 811,839. For this reason the description of the machine will be curtailed except so far as it may be necessary to describe certain relations to furnishing a complete disclosure of the present invention.

Figure 5:
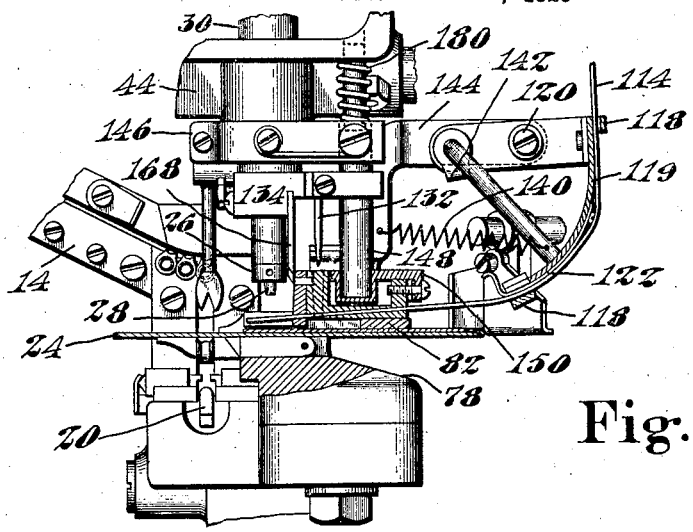
Fig. 5 is a front elevation, partly in section, of the elements grouped about the fastener-inserting locality, the movable parts being shown in their initial positions.

The frame 10 of the machine is provided with suitable bearings for a shaft 12 on which the several cams are fixed to operate the various mechanisms. Lacing-hooks are supplied to a raceway 14 by a suitable hopper (not shown) and are automatically separated at the lower end of said raceway and released one by one so that they may slide down an extension 16 (see Fig. 2) to the point of delivery. Each hook is transferred from the raceway extension 16 to a hook-sustaining plate 18 by a feeding member 20 (Fig. 5). The hook-sustaining plate 18 is carried by a vertically movable plunger 22 to insert the barrel of the hook upwardly through the work 24 and through the sections of reinforcing material as hereinafter explained.

The work is punched and fed with a step-by-step motion, and the inserted barrels of the hooks are clenched by a clenching tool 26 having a punching portion 28. This tool is fixed to the lower end of a vertically movable plunger 30 and receives its vertical motions from a cam 32 (Fig. 10) through a train of mechanism comprising a lever 34, gear segments 36, 38, a rock-shaft 40, and an arm (not shown) fixed to the rock-shaft and engaging a stud projecting from the plunger 30. The plunger 30 is arranged to slide in bearings 42 formed in a horizontally movable work-feeding carriage 44. Bosses formed on the upper part of this carriage are arranged to slide on a stationary guide rod 46 while a guide rod 48 fixed to the carriage slides in bearings 50 formed in the frame 10.

A four-way motion is imparted to the clenching tool 26 by compounding the vertical motions of the plunger 30 and the horizontal motions of the carriage 44. The mechanism for reciprocating the carriage 44 comprises a cam 52 (Fig. 10), a plunger 54 and a bell-crank comprising an arm 56, a hub or sleeve 58 and an arm 60. The latter arm is formed to straddle an anti-friction block 62 (Fig. 1) carried by a pin or stud affixed to the carriage 44. The arm 56 of the bell-crank is formed with a segmental slot 64 in which a block 66 is arranged to form operative connection with the plunger 54, the construction being such as to vary the amplitude of oscillatory motion imparted to the bell-crank by shifting the operating connection toward and from the outer end of the slot 64. For this purpose an adjusting link 68 is pivotally connected to the plunger 54 and to a lever 70. A gear segment 72 formed on the lever 70 is engaged by a gear segment 74 formed on a manually movable lever 76, commonly termed a "space regulator".

A stationary work-support 78 is affixed to the frame 10 and is formed with a recess to receive a punch-block 80 (Fig. 6), the upper surfaces of the work-support and punch-block being flush.

The work is periodically clamped upon the work-support and released by a presser-foot 82 (Fig. 1) having a vertical stem 84 arranged to slide in a bearing 86 in the frame 10. A vertical plunger 88 is arranged to slide in bearings 90 in the frame 10 and its upper end is connected to the presser-foot stem 84 so that a compression spring 92 normally pressing the plunger 88 downwardly will cause the presser-foot to clamp the work. The upper end of the spring 92 is seated against a portion of the frame 10 while the lower end is seated against a finger 94 affixed to the plunger. The presser-foot is periodically lifted by a cam 96 through the medium of a bell-crank comprising an arm 98, a rock-shaft 100 and an arm 102. A projection 104 carried by the arm 102 lifts the finger 94 against the pressure of the spring 92. The presser-foot may also be lifted by a treadle (not shown) to permit insertion and removal of an article of work. For this purpose a lever 106 is pivotally connected to the frame 10 and is provided with an arm arranged to engage the lower end of the plunger 88 and with an arm having connection with a treadle rod 108.

Figure 1:
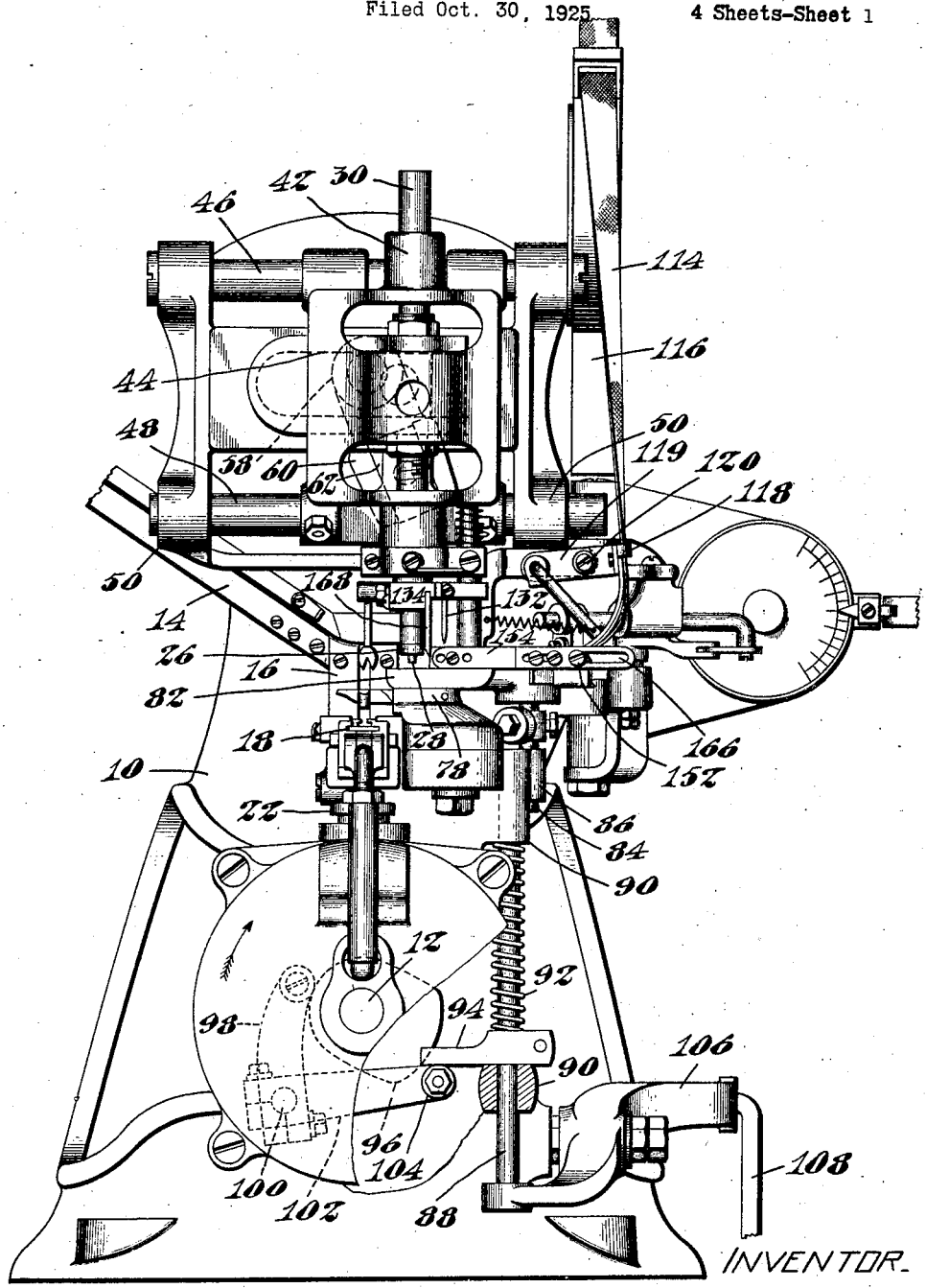
Fig. 1 is a front elevation of a fastener-inserting machine embodying the invention in a preferred form for reinforcing the anchorage of lacing-hooks as applied to shoe-uppers.
Figure 2:
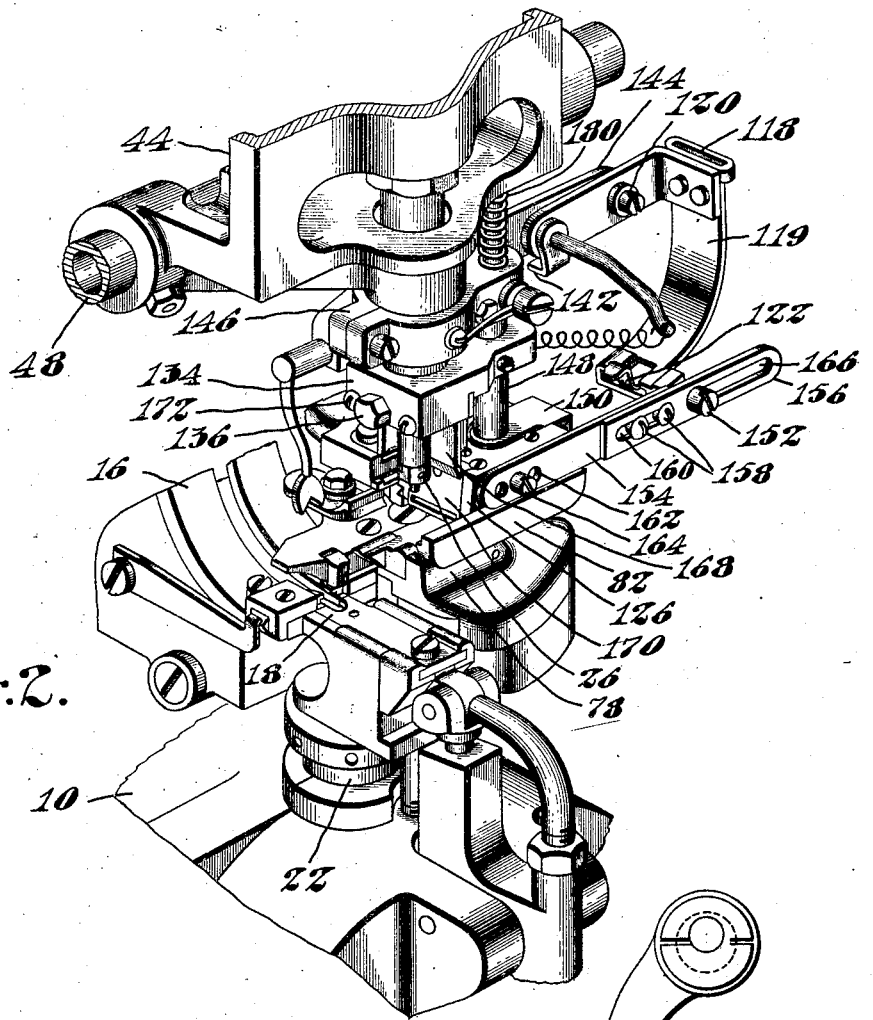
Fig. 2 is a perspective view of the elements grouped about the fastener-inserting locality.
Figures 6, 7, 8:
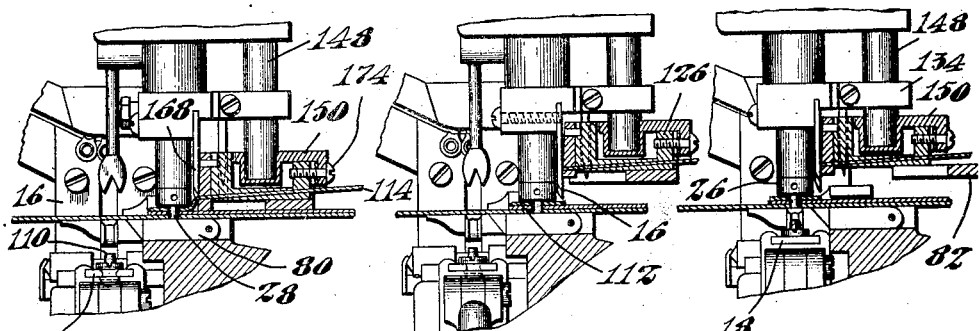
Figs. 6, 7, 8 and 9 are views similar to Fig. 5 but showing successive stages in a cycle of operations.
Figure 9:
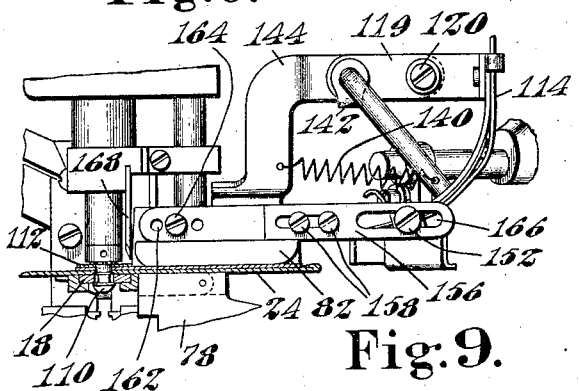

The shaft 12 is provided with suitable driving and stopping mechanism (not shown) which causes the parts to stop in the initial positions shown by Figs. 1, 2 and 5. A cycle of operations of the parts hereinbefore described is as follows: Assuming that an article of work 24, such as a shoe upper, has been placed on the work-support and clamped by the presser-foot 82, as shown in Fig. 5, the first motion following the tripping of the driving clutch is a downward motion of the plunger 30 to cause the punch 28 to punch the work, as shown by Fig. 6. At this moment a lacing-hook 110 is supported by the hook-sustaining plate 18, having been transferred to said plate during the preceding cycle. The presser-foot is immediately elevated to the position shown by Fig. 7, when the punch has completed its passage through the work, and the pressure of the punch on the punch-block is relieved without withdrawing the punch from the work. The feed-carriage 44 now moves from right to left to shift the tool 26 into register with the lacing-hook which is now rising (see Fig. 8). The presser-foot returns to its clamping position at this stage and the tool 26 remains stationary while the lower plunger 22 inserts the barrel of the lacing-hook through the work and causes it to be clenched by the tool 26. Next, the hook-engaging tools are slightly separated to relieve the clenching pressure and the hook-sustaining plate 18 is thereupon retracted horizontally to clear the throat of the clenched hook. The upper and lower plungers are next retracted from each other, the hook-sustaining plate 18 returning to its hook-receiving position (Fig. 2) and the tool 26 returning to its initial position (Fig. 5).

The illustrated machine is provided with novel automatic means for supplying individual sections 112 of reinforcing material (Figs. 12 and 13) to strengthen the anchorage of the fasteners 110. The reinforcing material from which the sections 112 are severed is supplied in the form of a strip 114 and stored in a magazine 116 in which it is coiled. The leading end of the strip 114 is threaded through eyes 118 formed in a take-up member 119 mounted to oscillate on a pivot 120. This member is also provided with a leaf spring 122 which co-operates with the lower eye 118 to clamp the strip with a pressure not so great as to prevent the strip from being readily drawn ahead relatively thereto when subjected to moderate tension. As shown by Fig. 5, the strip extends from the lower eye 118 to the left and passes through a channel 124 formed in a block 126 (see also Fig. 4). The leading end of the strip projects a short distance beyond the block 126 and underlies the punch 28.

As shown by Figs. 12 and 13, the sections 112 of reinforcing material are cut to a length shorter than the distance between the fasteners 110. Furthermore, in Fig. 13 the distance between the fasteners is greater than the corresponding distance in Fig. 12, but in both figures the sections of reinforcing material have the same length. It has been found in practice that a section of reinforcing material slightly more than one half inch square is large enough to reinforce the anchorage of an ordinary lacing-hook as used in a shoe-upper, provided the lacing-hook is located approximately at the center of the reinforcing piece. Consequently, when the lacing-hooks are spaced relatively far apart a considerable saving of reinforcing material may be effected by cutting the strip 114 into sections 112 of the size above specified and spacing said sections as shown in Figs. 12 and 13 instead of reinforcing the entire series of lacing-hooks with one continuous strip of reinforcing material. Furthermore, by severing the reinforcing material into individual sections the upper or other article 24 of work is maintained in a more flexible condition than if the reinforcing material were continuous throughout the series of fasteners. Accordingly, one of the features of the present invention consists in a new and improved organization of means, now about to be described, whereby a strip of reinforcing material may be automatically fed and severed into sections, and whereby the severed sections may be applied as shown in Figs. 12 and 13.

Figure 4:
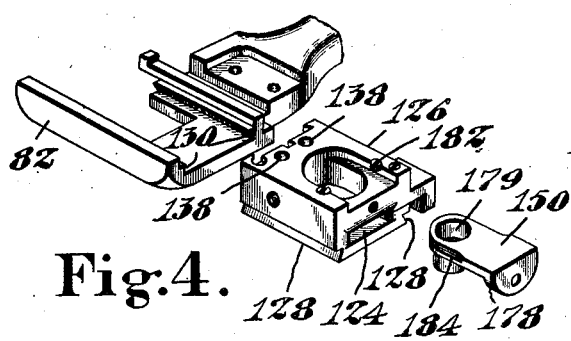
Fig. 4 is a perspective view of certain elements included in Fig. 3 but detached from each other to illustrate them individually.

Referring to Fig. 4, the block 126 is formed with dovetail flanges 128 which are arranged to slide in grooves 130 formed in the presser-foot 82, said flanges and grooves being parallel to the direction in which the work is fed. This sliding connection permits the block 126 to be reciprocated relatively to the presser-foot by the feed-carriage 44 to which the block is connected as hereinafter explained. Two sharp-pointed feeding spurs 132 (Fig. 5) are carried by a holder 134 affixed to the punch plunger 30. This holder is adjustable up and down relatively to the plunger 30 and is secured to the latter by a set-screw 136. Referring again to Fig. 4, the sliding block 126 is formed with two vertical holes 138 through which the spurs 132 pass to pierce the strip, as shown in Figs. 7 and 8. Thus, when the feed-carriage 44 moves from right to left to feed the work from the position shown by Fig. 7 to that shown by Fig. 8, the spurs 132, having pierced the strip, advance the leading end of the latter a distance equal to the length of the feeding step imparted to the upper, but, as will be subsequently explained, a relatively short backward movement may be imparted to said leading end to save a considerable amount of reinforcing material that would otherwise be wasted. The backward movement of the strip 114 is effected by oscillation of the take-up member 119 about its pivot 120. The lower end of the member 119 is normally drawn toward the left by a tension spring 140 and its movement in that direction is arrested by a stop 142 (Fig. 2) arranged to abut against the lower edge of a bracket 144. This bracket is affixed to the presser-foot 82 and provides a support for the pivot 120. The effective movement of the member 119 is transmitted from the feed carriage 44 through connections including a split collar 146 tightly clamped to the carriage, a vertical pin 148 extending through said collar, a member 150 (Fig. 4) superposed on the sliding block 126, means connecting the members 150 and 126, and a two-part adjustable link affixed to the block 126 and engaging a screw 152 secured in the member 119. The said adjustable link comprises a member 154 and a member 156 which are adjustably clamped to each other by two screws 158 which extend through a slot 160 in the member 156. Provision is also made for adjusting the position of this link relatively to the block 126, for which purpose the member 154 is provided with a series of holes 162 any one of which may be used to receive a pivot 164 which is screwed into the block. Relatively coarse adjustments of the link are afforded by the holes 162 while finer adjustments are afforded by the slot 160 and the clamping screws 158. A lost-motion connection between the link and the oscillatory member 119 is afforded by a slot 166 through which the connecting screw 152 extends.

Assuming that the adjustable link 154, 156 has been adjusted to effect a backward movement of the strip 114, such movement occurs during the latter stages of the return movement of the feed-carriage 44 to its initial position, that is, during its movement from left to right. This movement of the feed-carriage causes the left-hand end of the slot 166 to abut against the screw 152 so that any further movement of the link to the right will swing the member 119 and thereby move the strip backward. This movement of the take-up member 119 represents the space between two adjacent reinforcing sections 112. As the stroke of the feed-carriage 44 is increased, a corresponding increase in the take-up movement of the member 119 follows incidentally thereto. Likewise, the take-up movement is decreased by a decrease in the stroke of the feed-carriage 44, so that the length of the reinforcing sections 112 is maintained at one standard and is unaffected by changes in the length of the feeding steps imparted to the work 24. The only adjustment that affects the length of the sections 112 is the individual adjustment of the link 154, 156.

When the parts are in their initial positions, as shown by Figs. 1, 2 and 5, the oscillatory take-up member 119 is tilted by the link 154, 156 so that the stop member 142 is separated from the lower edge of the supporting bracket 144. Consequently, when the feed-carriage 44 moves from right to left to feed the work 24 it carries with it the two-part link 154, 156 and thereby permits the spring 140 to swing the take-up member 119 to the left until said member is arrested by engagement of its stop member 142 with the lower edge of the bracket 144. As the feed-carriage continues to move to the left thereafter, the strip-feeding spurs 132 draw the strip ahead relatively to the take-up. During the first stages of the return movement of the feed-carriage 44 to its initial position, the take-up device, still clamping the strip, holds the latter stationary, the feeding spurs 132 at this time being disengaged from the strip. But during the latter stages, the lost motion in the slot 166 having been taken up, the link 154, 156 swings the take-up 119 to the right to impart a backward movement to the leading end of the strip.

Figure 3:
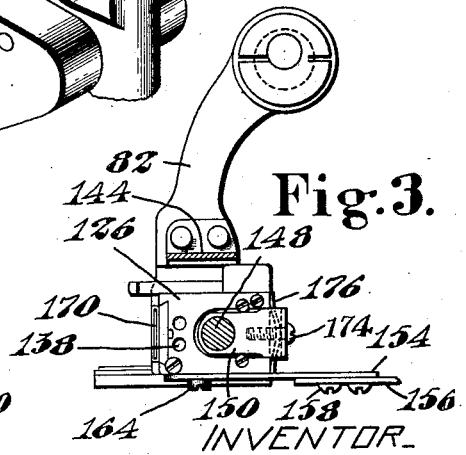
Fig. 3 is a top plan view, partly in section, of the presser-foot and elements of the strip-feeding and severing means carried thereby.

The strip is severed in each cycle of operations by cooperative cutters 168 and 170 organized substantially as disclosed in Wakefield Patent 1,154,553 granted September 21, 1915. As shown best by Figs. 2 and 3, the cutter 170 is formed with a slot through which the strip 114 is fed. This cutter is fitted to the sliding block 126 and may be fastened in any desired manner. The cutters are arranged to sever the strip with a shearing action (see Figs. 6 and 7). The cutter 168 is fastened to the holder 134 by screws 172. A screw 174 (Fig. 3) retains a leaf spring 176 in position to bear against the right-hand end of the block 126 to maintain the cutter 170 against the cutter 168 with pressure sufficient to insure a clean cut. This spring is seated against a lip 178 formed on the member 150 and having a hole through which the retaining screw 174 extends loosely. A socket 179 is formed in the member 150 to receive the pin 148, the latter being normally depressed and maintained in said socket by a compression spring 180 (Fig. 5), but being movable upwardly to break the operative connection between the feed-carriage 44 and the sliding block 126 so that the block may be detached from the presser-foot. The members 150 and 126 are connected by screws 182 and flange 184 (Figs. 3 and 4) but this connection permits relative horizontal movement by which the force of the spring 176 may be applied to maintain the aforesaid pressure of the cutter 170 against the cutter 168.

The cutters are preferably organized to sever the strip 114 not when the cutter 168 moves downwardly but when the cutter 170 moves upwardly. The punching movement of the plunger 30 carries the cutting edge of the cutter 168 nearly but not quite to the strip 114 which initially projects to the left from the cutter 170 a distance equal to the net feeding movement of the strip (see Fig. 5). Thus, when the punch descends to the position shown by Fig. 6, it passes through the projecting portion of the material incidentally to punching a hole in the article 24, and the point at which it passes through the reinforcing material is substantially in the center of the portion that will subsequently be severed. The upward movement of the presser-foot by which the work is released prior to the feeding motion, raises the cutter 17 first sufficiently to sever that portion of the strip that has previously been measured off to form an individual reinforcing section 112.

Having described my invention, what I claim as new and desire to secure by Letters Patent of the United States is:

1. In a fastener-inserting machine, mechanism arranged to feed an article of work step by step, means operated by said mechanism to impart to a strip of reinforcing material, for each cycle of operations, a net feeding movement shorter than that imparted to the article of work, mechanism arranged to sever such strip into sections commensurate with the net feeding movement thereof, and mechanism arranged to insert fasteners into the article of work and into said sections respectively.

2. In a fastener-inserting machine, work-feeding mechanism including a reciprocatory feed-carriage, means operated by said carriage for imparting to a strip of reinforcing material for each cycle of operations a net feeding movement shorter than the stroke of said carriage, mechanism arranged to sever such strip into sections commensurate with said net feeding movement, and mechanism arranged to insert fasteners into the work and into such sections respectively.

3. In a fastener-inserting machine, mechanism arranged to feed an article of work and the leading end of a strip of reinforcing material with steps of equal length and to impart a relatively short backward step to said leading end in each cycle of operations so that the net feeding steps of the strip will be shorter than the feeding steps of the article of work, means arranged to sever said strip into sections commensurate with said net feeding steps, and mechanism arranged to insert fasteners into said article and into said sections respectively.

4. In a fastener-inserting machine, regulatable mechanism arranged to feed an article of work and the leading end of a strip of reinforcing material with steps of equal but variable length and to impart a relatively short backward step of variable length to said leading end in each cycle of operations to produce net feeding movements of the strip shorter than the feeding steps of the article of work, means arranged to sever said strip into sections commensurate with said net feeding steps, and mechanism arranged to insert fasteners into said article and into said sections respectively.

5. In a fastener-inserting machine, regulatable mechanism for feeding the work step by step with steps of variable length, means operated by said mechanism for imparting to the leading end of a strip of reinforcing material feeding steps of the same length as those imparted to the work and relatively short backward steps to said leading end so that the net feeding movement of the strip in each cycle of operations will be of a standard length irrespective of the length of the feeding steps imparted to the work, means arranged to sever said strip into sections, and mechanism arranged to insert fasteners into the work and into said sections respectively.

6. In a fastener-inserting machine, work-feeding mechanism including a reciprocatory feed-carriage by which the work is fed step by step, means operated by said carriage to impart feeding steps to a strip of reinforcing material and relatively short backward steps to the leading end of said strip so that the net feeding movement of the strip in each cycle of operations will be shorter than the feeding steps imparted to the work, means arranged to sever said strip into sections, and mechanism arranged to insert fasteners into the work and into said sections respectively.

7. In a fastener-inserting machine, work-feeding mechanism including a reciprocatory feed-carriage by which the work is fed step by step, means operated by said carriage to impart to a strip of reinforcing material feeding steps of the same length as those imparted to the work, regulatable means operated by said carriage to impart backward steps of variable length to the leading end of said strip, means arranged to sever said strip into sections, and mechanism arranged to insert fasteners into the work and into said sections respectively.

8. In a fastener-inserting machine, work-feeding mechanism including a reciprocatory feed-carriage, means operated by said carriage to move the leading end of a strip of reinforcing material lengthwise different distances in opposite directions in each cycle of operations to give the strip a net feeding movement shorter than the feeding stroke of said carriage, said means including an adjustable element to regulate the length of the net feeding movement of said strip, means arranged to sever said strip into sections, and mechanism arranged to insert fasteners into the work and into said sections respectively.

9. In a fastener-inserting machine, regulatable work-feeding mechanism including a reciprocatory feed-carriage the stroke of which is variable in length, means operated by said carriage to move the leading end of a strip of reinforcing material lengthwise different distances in opposite directions in each cycle of operations to give the strip a net feeding movement shorter than the stroke of said carriage, said means having provision for varying the length of said net feeding movement independently of the length of feeding movement imparted to the work, means arranged to sever said strip into sections, and mechanism arranged to insert fasteners into the work and into said sections respectively.

10. In a fastener-inserting machine, work-feeding mechanism including a reciprocatory feed-carriage, means operated by said carriage to reciprocate the leading end of a strip of reinforcing material lengthwise, said means including a lost-motion connection to produce a differential between movement of the strip in one direction and movement thereof in the opposite direction so that the strip will receive a net feeding movement, in each cycle of operations, shorter than the feeding movement imparted to the work, means arranged to sever said strip into sections, and mechanism arranged to insert fasteners into the work and into said sections respectively.

11. In a fastener-inserting machine, mechanism arranged to feed the work step by step, means arranged to feed a strip of reinforcing material, a take-up arranged to engage said strip, means arranged to operate said take-up to move the leading end of said strip backward in each cycle of operations so that the net feeding movement of said leading end will be shorter than the feeding movement of the work, means arranged to sever said strip into sections, and mechanism arranged to insert fasteners into the work and into said sections respectively.

12. In a fastener-inserting machine, mechanism arranged to feed the work step by step, a device arranged to clamp a strip of reinforcing material, means arranged to feed said strip relatively to said clamping device, means arranged to move said clamping device to impart a backward movement to said strip in each cycle of operations, means arranged to sever said strip into sections, and mechanism arranged to insert fasteners into the work and into said sections respectively.

13. In a fastener-inserting machine, reciprocatory mechanism arranged to feed an article of work and the leading end of a strip of reinforcing material with steps of equal length, a strip-clamping device relatively to which said strip is fed by said mechanism, means arranged to move said device to impart a relatively short backward step to the leading end of said strip in each cycle of operations, means arranged to sever said strip into sections, and mechanism arranged to insert fasteners into the work and into said sections respectively.

14. In a fastener-inserting machine, feeding mechanism including a reciprocatory carriage by which an article of work and the leading end of a strip of reinforcing material are fed with steps of equal length, regulatable means actuated by said carriage for imparting a backward step of variable length to said leading end in each cycle of operations to make the net feeding steps of said strip shorter than the feeding steps of said article, means arranged to sever said strip into sections, and mechanism arranged to insert fasteners into the work and into said sections respectively.

In testimony whereof I have signed my name to this specification.

MAURICE G. WESTON.